Feb. 11, 1936.    G. G. SABINS    2,030,471
SEPARABLE FASTENER
Filed July 24, 1934
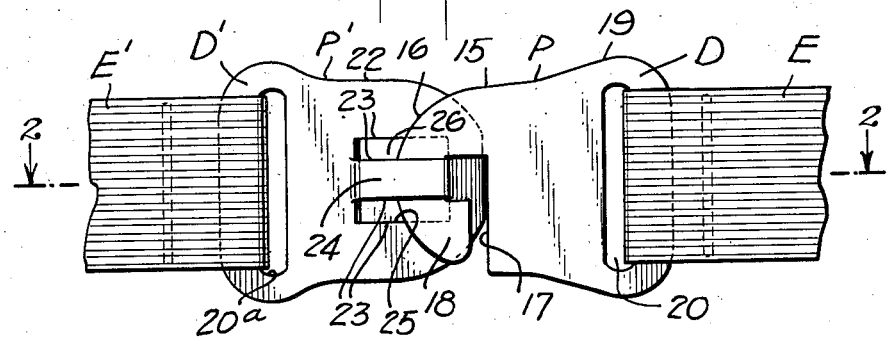
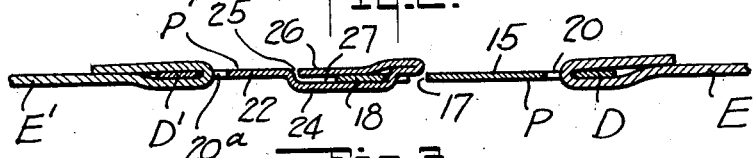
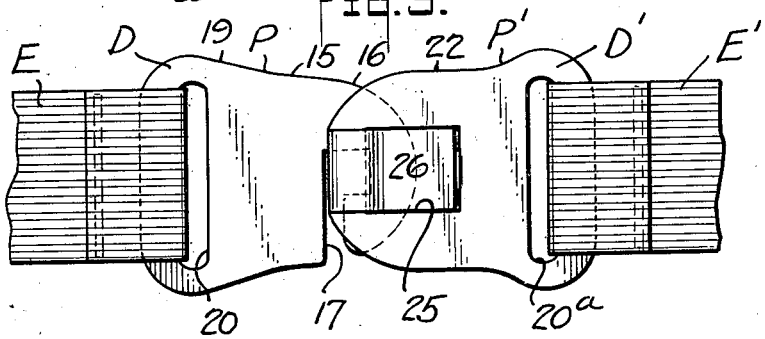
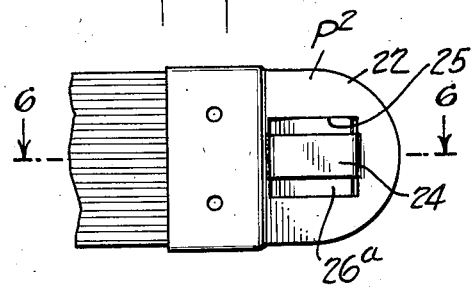 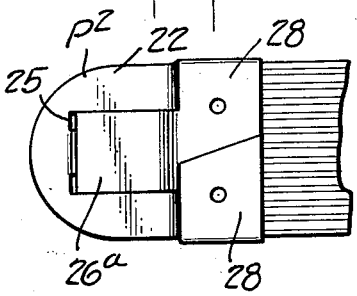
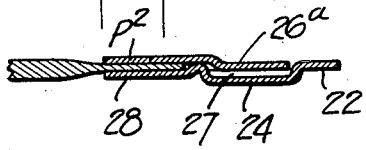
INVENTOR.
GEORGE G. SABINS
BY
Edwin D. Jones
ATTORNEY Patented Feb. 11, 1936

2,030,471

UNITED STATES PATENT OFFICE 2,030,471

SEPARABLE FASTENER

George G. Sabins, Glendale, Calif., assignor to Samuels-Kleiner, Ltd., Los Angeles, Calif., a corporation of California Application July 24, 1934, Serial No. 736,667

4 Claims. (Cl. 24—226)

My invention relates to separable fasteners of the character embodied in my copending application filed March 30, 1934, Serial No. 718,151, now Patent No. 2,001,942, dated May 21, 1935, wherein the fastener comprises hook and eye parts structurally characterized by their flatness so that no protuberances or humps are presented when the fastener is worn beneath the sheerest of outer garments. The fastener is particularly applicable to the parts of that elastic back strap employed on a brassière for securing the latter in body embracing position.

It is a purpose of my present invention to provide a separable fastener which is structurally characterized by an eye part constructed to positively direct or guide the bill of the hook part into and through the eye of the eye part, so that the two parts will have proper fastening engagement one with the other to positively secure the two parts of the elastic strap together. A further purpose of my invention is the provision of a separable fastener which has strap attaching devices that permit a strap to be secured manually to the respective fastener parts by looping and stitching the strap ends.

I will describe only two forms of separable fasteners each embodying my invention, and will then point out the novel features thereof in claims.

In the accompanying drawing:

Fig. 1 is a view showing in front elevation one form of separable fastener embodying my invention with the two parts thereof in fastened position and attached to the confronting ends of a two part elastic strap.

Fig. 2 is a longitudinal sectional view taken on the line 2—2 of Fig. 1.

Fig. 3 is a view similar to Fig. 1, but showing the fastener in rear elevation.

Figs. 4 and 5 are views showing in front and rear elevation, respectively, another form of eye part of a fastener embodying my invention, and which eye part is shown attached to an elastic strap.

Fig. 6 is a sectional view taken on the line 6—6 of Fig. 4.

In the form of my invention shown in Figs. 1 to 3, I provide a separable fastener comprising a hook part P, an eye part P¹, and devices D and D¹, for the respective fastener parts, designed for attaching such parts to the confronting ends E and E¹ of a two part elastic strap, such as used on brassières for holding the latter in body embracing position, or the ends of a single length of elastic strap such as used for the band type or round garter.

The hook part P and its attaching device D are made of a single sheet of thin metal, and the hook part comprises a flat body 15 having a rounded edge 16 at its free end, and provided with an inverted L-shaped slot 17 so formed therein that the free end of the body constitutes a hook 18.

The attaching device D comprises a flat body 19 which is formed integral with the body 15 but wider than the latter in order that a slot 20 therein may be of a length sufficient to permit the strap end E to be extended therethrough and lie flatwise therein.

The strap end E is permanently secured to the device D by extending it through the slot 20, bending it back on itself to form a loop, and then stitching it transversely as indicated at 21, to permanently close the loop.

The eye part P¹ and the attaching device D¹ are also constructed from a single sheet of thin metal. The eye part comprises a flat body 22 slit or slotted along parallel lines 23 and then outstruck between the slots to form an elongated head 24 disposed laterally to the front side of the body, and an opening 25 in the body itself opposite the head but larger than the head.

This opening 25 is completely closed by a tongue or extension 26 formed on the front end of the body 22. As shown, this extension is bent rearwardly and inwardly so as to completely span and fill the opening 25, and to thus coact with the head 24 in forming an eye 27 through which the bill of the hook is adapted to be extended. Of course, the head 24 in its lateral positioning with respect to the body 22, forms an eye as in the fastener embodied in my other application hereinbefore referred to. However, by the provision of the extension 26, the opening 25 is closed to form a backing for the eye. Thus it may be said that the extension coacts with the head 24 to form the eye 27.

The attaching device D¹ is of the same construction as the device D in that it is flat, formed with a transverse slot 20ª, and wider than the body 22, as best shown in Fig. 2. Thus the strap end E¹ can be extended through, looped and stitched in the same manner as the strap end E, to secure it to the eye part P¹.

With the hook and eye parts of my fastener secured to the respective ends of the strap, interengagement of the fastener parts to fasten one strap end to the other, can be easily effected in the following manner:

The hook part P is positioned above the eye part so that the free end or bill of the hook can be extended into the upper end of the eye 27. In applying the hook its bill cannot pass into the opening 25, but it must engage the flat surface of the extension and thus it is positively guided downward between the extension and head to reach a final position in which the hook engages the head as shown in Fig. 1. Therefore, the two parts of the fastener are now interlocked to secure the strap ends together under the tension exerted by the straps.

Referring now to Figs. 4, 5, and 6, I have here shown another form of eye part which may be used equally well with the hook part P as the eye part P¹. This eye part is designated generally at P², and it is constructed in the same manner as the part P¹, but with the following exceptions:

The eye part P² has an extension or tongue 26ª which fills the opening 25ª in the same manner and for the same purpose as the extension 26. However, in this instance the extension is formed on one of a pair of strap attaching fingers 28. As best shown in Fig. 5, the extension projects forwardly and inwardly to close the opening 25ª. As the fingers 28 are identical to the strap attaching fingers disclosed in my application hereinbefore referred to, a detailed description thereof here, is not required.

Although I have herein shown and described only two forms of separable fasteners embodying my invention, it is to be understood that various changes and modifications may be made herein without departing from the spirit of my invention and the spirit and scope of the appended claims.

What I claim is:

1. A separable fastener, comprising; an eye part having a body provided with an opening between its ends; a head on the body spanning said opening at one side of said body; an extension on one edge of the body extending inward to span said opening at the other side of said body and spaced from the head to form an intervening eye; and a hook part having a hook extendable through said eye to engage said head, and be positively guided in its movement by said head and extension.

2. A separable fastener, comprising; an eye part having a flat body provided with an opening; a head secured to and projecting from one side of the body, and spanning said opening; a tongue extending from one edge of the body, spanning said opening at the other side of said body, and spaced from said head to form an eye; and an attaching device on one end of the body having a slot therein.

3. In a separable fastener; an eye part having a flat body provided with a portion projecting laterally from and lengthwise of said body to form an eye between the remainder of the body and said portion so as to have entrances at either edge of said portion, said body being provided with an opening, said opening being spanned by said portion at one side of said body; and an extension on one end of said body bent rearwardly to close said opening at the other side of said body and form a backing for said eye adapted to guide a hook into said eye through said entrances.

4. A separable fastener, comprising; an eye part having a flat body provided with a portion projecting laterally from and lengthwise of said body to form an eye between the remainder of the body and said portion so as to have entrances at either edge of said portion, said body being provided with an opening, said opening being spanned by said portion at one side of said body; an extension on one end of said body bent rearwardly to close said opening at the other side of said body in such manner as to form a backing for said eye; and a hook part having a body provided with a portion so shaped as to form a hook extendable into said eye through said entrances.

GEORGE G. SABINS.